United States Patent Office 3,064,020
Patented Nov. 13, 1962

3,064,020
DICYCLOPENTADIENYL METAL COMPOUNDS
Randolph Riemschneider, Berlin-Charlottenburg, Germany, assignor to Ethyl Corporation, New York, N.Y., a corporation of Delaware
No Drawing. Filed Sept. 20, 1957, Ser. No. 685,083
4 Claims. (Cl. 260—429)

This invention relates to dicyclopentadienyl metal compounds and more particularly to a novel and unusual process for their preparation.

Dicyclopentadienyl metal compounds have been prepared by reacting metal halides with a cyclopentadienyl Grignard reagent or by reacting the metal salts with an alkali metal cyclopentadienide in liquid ammonia or tetrahydrofuran. However, these methods are expensive and only lead to moderate yields of the desired product.

It is therefore an object of this invention to provide a novel and unusual process for the preparation of dicyclopentadienyl metal compounds. Additional objects will become apparent from the following specification and claims.

It has now been found that non-ferrous dicyclopentadienyl metal compounds are prepared in excellent yields by a process which comprises reacting a non-ferrous metal salt with the vapor of a cyclopentadiene hydrocarbon. In this manner, dicyclopentadienyl compounds of vanadium, chromium, manganese, cobalt and nickel are prepared in superior yields.

According to the present invention the vapor of a cyclopentadiene hydrocarbon is passed over the metal salt, which salt is maintained at a temperature of between 300° and 400° C. in an inert atmosphere. The salt of the metal is preferably contained in a suitable apparatus to facilitate heating thereof, and removal of the product dicyclopentadienyl metal compound. The reaction is conducted in an inert atmosphere which may also serve as a carrier for the cyclopentadiene hydrocarbon vapor. In one embodiment of this invention the metal salt is contained in an inert, high-boiling solvent or carrier, either in solution or suspension at the appropriate temperature and the cyclopentadiene hydrocarbon vapor is bubbled through the liquid.

A preferred embodiment of the present invention consists of reacting a cyclopentadiene hydrocarbon with the salt of a nonferrous metal which salt is derived from organic acid. It has been found that in some unexplainable fashion superior yields of dicyclopentadienyl vanadium, chromium, manganese, cobalt and nickel compounds are prepared in this manner.

Another embodiment of this invention comprises reacting the salt of a non-ferrous metal with a vapor containing a mixture of cyclopentadiene hydrocarbons. This embodiment of this invention often leads to unsymmetric dicyclopentadienyl compounds which are not susceptible to preparation by previously known methods. Thus, cyclopentadienyl-methylcyclopentadienyl cobalt is prepared according to the process of this invention by reacting cobaltous oxalate with a gaseous mixture of cyclopentadiene and methylcyclopentadiene.

The reaction between a metal salt and a cyclopentadiene hydrocarbon is entirely unexpected and has the advantage that the preliminary step of preparing an alkali metal or alkaline earth metal cyclopentadienide is avoided. The present invention also has the advantage that the reaction product is not contaminated with an inorganic alkali or alkaline earth salt as is the case when the reaction between an alkali metal or alkaline earth metal cyclopentadienide and a metal salt is employed to prepare a cyclopentadienyl metal compound. Thus, the process of this invention easily leads to dicyclopentadienyl metal compounds which may be utilized without further purification. This is particularly advantageous when the compound is to be used as an intermediate in the preparation of other cyclopentadienyl metal compounds. For example, methylcyclopentadienyl manganese tricarbonyl is conveniently prepared from di(methylcyclopentadienyl)manganese which is prepared by the process of this invention.

The following specific examples, in which all parts and percentages are by weight, are illustrative of the process of this invention.

Example I

The apparatus contained a reaction zone and heating means therefor, means for passing gaseous reactants through the reaction zone and a plurality of cold traps at various temperatures to collect reaction products and unreacted starting materials in the exit gases. The reaction zone was charged with 2,000 parts of cobaltous oxalate and the apparatus was flushed with nitrogen while the reaction zone was heated to 400° C. over a 25 minute period. When the 400° temperature was reached the nitrogen was passed at the rate of 210 parts per minute through a reservoir of freshly cracked cyclopentadiene maintained at 30° C. and the resulting mixture was passed through the reaction zone over the metal salt for a period of 45 minutes. Product, dicyclopentadienyl cobalt was collected in a cooled trap, while unreacted cyclopentadiene was collected in a second trap which was maintained at Dry-Ice temperature. The yield of dicyclopentadienyl cobalt was 200 parts. The melting point of this product is about 172° C.

Example II

The procedure of Example I was followed employing 2,000 parts of nickelous oxalate. The reaction zone was heated between 370 to 400° C., while the cyclopentadiene reservoir was maintained at 0 to 10° C. The nitrogen carrier stream was fed through the cyclopentadiene at 118 parts per minute. After 45 minutes a good yield of dicyclopentadienyl nickel was obtained. This compound has a melting point of about 172° C.

Example III

The procedure of Example II was followed except that indene was reacted with the nickelous oxalate at temperatures up to 400° C. The indene reservoir was maintained at 170° C. and the nitrogen stream was fed through the indene reservoir at the rate of 1250 parts per minute. An excellent yield of di-indenyl nickel was collected in the trap.

Example IV

The procedure of Example I was followed. The reaction zone was maintained at 350° C. while methylcyclopentadiene was passed over 2,000 parts of cobaltous oxalate. The methylcyclopentadiene reservoir was maintained at 25–30° C. while 50 parts per minute of nitrogen were passed through and the resultant mixture of nitrogen and methylcyclopentadiene was passed through the reaction zone for 60 minutes. Two hundred ten parts of di(methylcyclopentadienyl)cobalt were collected in the trap.

Example V

The metal salt was 2000 parts of nickelous acetate and the inert atmosphere and carrier for the hydrocarbon reactant was nitrogen. The reaction was conducted according to the procedure outlined in Example 1 at 360° C. The nitrogen was passed rapidly through a reservoir of cyclopentadiene and the mixture passed over the nickelous acetate. Five hundred parts of green crystals of dicyclopentadienyl nickel were recovered from the cold trap. The compound had the accurate melting point of 172.5–173° C. without further purification.

Example VI

The procedure of Example I was followed except that 2500 parts of vanadium citrate is employed as the metal reactant and is reacted with ethylcyclopentadiene at 300° C. The reaction is continued for 5 hours by passing in a stream of nitrogen (45 parts per minute) through the ethylcyclopentadiene which is maintained at about 30° C. A good yield of dicyclopentadienyl vanadium results.

Example VII

The procedure of Example I is repeated employing 1800 parts of chromic chloride as the organic metal salt. A stream of carbon dioxide (400 parts per minute) is passed through the reservoir of n-butylcyclopentadiene maintained at 40° C., and the resulting mixture is passed over the reaction zone heated to 300° C. An excellent yield of di(n-butylcyclopentadienyl) chromium results.

Example VIII

The reaction zone of the apparatus in Example I is charged with 1500 parts of manganous formate which is reacted with iso-propylcyclopentadiene carried in a nitrogen stream. The reaction zone is heated to 330° C. while the iso-propylcyclopentadiene is supplied from a reservoir maintained at 35° C. by passing the nitrogen through at the rate of 200 parts per minute. Di(iso-propylcyclopentadienyl)manganese is collected in the cooled trap.

Example IX

The procedure of Example VIII is followed except that the manganese salt employed is manganous propionate and the cyclopentadiene hydrocarbon is methylcyclopentadiene. The reaction is conducted for about 3 hours. An excellent yield of di(methylcyclopentadienyl)manganese results.

Example X

In an apparatus equipped with a reservoir for containing a liquid reaction mixture at high temperatures, heating means, temperature measuring device, means for charging and discharging gaseous reactants is placed 3000 parts of cobaltous eicosanoate and 5000 parts of dimethylpolysiloxane consisting essentially of nonomer, decomer, undecomer and dodecomer and which has an average molecular weight of about 900. The mixture is heated to about 315° C. with agitation while a stream of argon is passed therethrough. When the elevated temeprature is reached the argon is first passed through a reservoir of octylcyclopentadiene maintained at about 120° C. and the mixture of argon and hydrocarbon vapor is passed through the silicone oils containing the cobalt salt for a period of about 3 hours. Di(octylcyclopentadienyl)cobalt results in good yield.

Example XI

The procedure of Example X is followed except that 6000 parts of anthracene is employed as the carrier and 1000 parts of nickel methacrylate is employed as the organo metal salt. The inert atmosphere in this example is carbon dioxide and the cyclopentadiene hydrocarbon reactant is methylcyclopentadiene. An excellent yield of di(methylcyclopentadienyl)nickel results.

Example XII

In this example the cyclopentadiene hydrocarbon is benzylcyclopentadiene which is conveniently prepared by the reaction of benzyl chloride and potassium cyclopentadienide. The metal salt is cobaltous nitrate. Argon is employed as the inert carrier and the temperture of the reaction is 315° C. An excellent yield of di-(benzylcyclopentadienyl)cobalt results.

Example XIII

According to the procedure outlined in Example I, 2000 parts of nickelous oxalate are reacted with a mixture of cyclopentadiene and methylcyclopentadiene at 320° C. The inert carrier is carbon dioxide. A mixture of dicyclopentadienyl nickel, di(methylcyclopentadienyl)nickel, and cyclopentadienyl-methylcyclopentadienyl nickel in which the last named compound predominates is collected in the cold trap. This mixture can be separated by fractional distillation at reduced pressure.

In a similar manner unsymmetric dicyclopentadienyl compounds of cobalt, manganese, chromium and vanadium are also prepared by reacting a metal salt with a vapor containing a mixture of cyclopentadiene hydrocarbons. Further examples of such compounds include ethylcyclopentadienyl-methylcyclopentadienyl manganese, cyclopentadienyl-propylcyclopentadienyl chromium, benzylcyclopentadienyl-cyclopentadienyl vanadium, methylcyclopentadienyl-cyclopentadienyl manganese and the like.

The process of this invention is carried out at temperatures of between about 300° C. and 400° C. depending upon the particular reactants and apparatus employed. Generally temperatures throughout this range are applicable and excellent results are obtained when they are employed. Higher temperatures may be employed, but the yield may be reduced.

An inert atmosphere is maintained when conducting the novel process of this invention so that the reactants and products do not become contaminated by exposure to atmospheric oxygen at the elevated temperatures employed. Nitrogen is a preferred atmosphere in which to conduct the process, however, carbon dioxide, hydrogen and inert gases such as argon can also be employed. The process should be conducted in the absence of reactive gases such as oxygen. Thus the reaction proceeds very well in a partial vacuum where substantially the vapor pressure is due to the presence of the cyclopentadiene hydrocarbon.

The non-ferrous metal salts applicable to the process of this invention are salts of vanadium, chromium, manganese, cobalt and nickel. They include the halogen salt wherein the halogen has an atomic number of at least 17, i.e., the chlorides, bromides and iodides, and various other inorganic salts. Vanadium tetrabromide, chromium chloride, manganous iodide, cobaltic nitrate, manganous nitrate represent examples of the various applicable inorganic salts. The preferred organic acid salts applicable to this invention are salts of vanadium chromium, manganese, cobalt and ickel that may be derived from mono, di, and tri-carboxylic acids. Examples of this applicable salt include cobaltic citrate, nickelous acetate, manganous oxalate, chromic gluconate, vanadium propionate, manganic butyrate, cobaltous eicosanoate, manganous glyoxylate, chromous stearate, manganous oleate, nickelous caprylate, cobaltous methacrylate and the like. These acid salts may be derived from acids containing unsaturation and other functional groups such as the hydroxyl group. Salts derived from acids having up to 20 carbon atoms may be employed. Complex metal salts are also applicable to the process of this invention. An example is a complex salt of oxalic acid having a metal component in the anion, $Cr[Cr(C_2O_4)_3]_3$.

The cyclopentadiene hydrocarbon applicable to the process of this invention include cyclopentadiene, indene and suitable substitution products of these. Thus cyclopentadienyl hydrocarbons such as methylcyclopentadiene, ethylcyclopentadiene, propylcyclopentadiene, isopropylcyclopentadiene, octylcyclopentadiene, phenylcyclopentadiene, benzylcyclopentadiene, methylindene and the like are applicable. Those having from about 5 to 13 carbon atoms are preferred. Many cyclopentadiene hydrocarbon compounds exist as the dimers or higher polymers which can ordinarily be converted into a monomeric hydrocarbon with application of heat. These can often be employed in the process of this invention as they are converted to the monomer at the temperatures of the reaction. Thus excellent results are obtained when such compounds as dicyclopentadiene and di(methylcyclopentadiene) are employed. As indicated above, excellent results are also obtained when mixtures of the various cyclopentadiene hydrocarbons are employed in the process of this invention.

Liquid carriers applicable to the process of this invention for suspending or dissolving the metal organic salt include inert compounds which are liquid at the reaction temperature such as silicone oils, high-boiling aromatic hydrocarbons, aliphatic hydrocarbons and the like. The choice of the carrier is primarily dependent on the temperature at which the process is conducted. Examples of applicable silicone oils include copolymers and homopolymers of the various organosiloxanes having the appropriate boiling range. These may be dimethyl polysiloxanes, methylphenyl polysiloxanes, diphenyl polysiloxanes, di(chlorophenyl)polysiloxanes and the like. Phenanthrene, anthracene, chrysene and the like represent applicable aromatic hydrocarbons.

The process of this invention is applicable to continuous operations. For example, the cyclopentadiene hydrocarbon reactant and the metal salt can be simultaneously introduced into a reaction zone which is heated to the applicable temperatures. The apparatus containing the reaction zone is preferably equipped to maintain the reactants in a state of constant agitation. The reactants move gradually through the reaction zone at such a rate that maximum yields of the desired dicyclopentadienyl metal compounds are produced.

The dicyclopentadienyl metal compounds produced by the novel process of this invention have a variety of uses, for example, dicyclopentadienyl nickel is proposed as a catalyst and intermediate in U.S. Patent 2,680,758. The dicyclopentadienyl manganese compounds are valuable as intermediates in the preparation of cyclopentadienyl manganese tricarbonyl compounds which are extremely valuable and useful antiknock agents when added to liquid hydrocarbon fuels of the gasoline boiling range. For example, methylcyclopentadienyl manganese tricarbonyl is prepared by reacting 40 parts of di(methylcyclopentadienyl)manganese (the preparation of which is illustrated in Example IX) with carbon monoxide according to the following procedure. The di(methylcyclopentadienyl)manganese is kept under nitrogen and charged to a pressure resistant vessel equipped with heating means, stirring means and means for admitting reactants under pressure. Four hundred parts of tetrahydrofuran are also charged to the vessel which is then heated while the vessel is kept under constant agitation. The mass temperature is maintained at 148° C. and the carbon monoxide pressure varies from 680 to 2175 p.s.i.g. After one hour at the elevated temperature the vessel is cooled, vented and the product mixture removed. Methylcyclopentadienyl manganese tricarbonyl is recovered from the reaction mixture by fractional distillation at reduced pressures. The product distills at 106.5° C. at a pressure of 12 milliliters. The compound is a liquid having a freezing point of about −0.75° C. and refractive index ($n_D^{20}$) of 1.5873.

This methylcyclopentadienyl manganese tricarbonyl is an outstanding antiknock agent when added to liquid hydrocarbon fuels of the gasoline boiling range. For example, when methylcyclopentadienyl manganese tricarbonyl was added to a commercial gasoline having an initial boiling point of 94° F., and a final boiling point of 390° F. in amount sufficient to prepare a composition containing 1 gram of manganese per gallon, the octane number of the gasoline was raised from 83.1 to 92.3 as determined by the Research Method. The Research Method of determining the octane number of a fuel is generally accepted as a method of test which gives a good indication of fuel behavior in full-scale automotive engines under normal driving conditions and the method used most by commercial installations in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D-908-55 contained in the the 1956 edition of "ASTM Manual of Engine Test Methods for Rating Fuels."

Having fully described the present invention in many of its embodiments, it is not intended to be limited except within the scope of the appended claims.

I claim:

1. A process for the preparation of a bis(cyclopentadienyl)metal compound in which the metal is selected from the group consisting of vanadium, chromium, manganese, cobalt and nickel, which process comprises reacting in a neutral atmosphere a material consisting essentially of a heated metal salt, said salt being substantially free from iron selected from the group consisting of vanadium, chromium, manganese, cobalt and nickel inorganic and organic salts, said organic salts being derived from an organic acid containing only carbon, hydrogen and oxygen, with a vapor of a cyclopentadiene hydrocarbon having from five to 13 carbon atoms.

2. The process which comprises passing the vapor of a cyclopentadiene hydrocarbon having from 5 to 13 carbon atoms over a material consisting essentially of a heated metal salt, said salt being substantially free from iron selected from the group consisting of vanadium, chromium, manganese, cobalt and nickel inorganic and organic salts, said organic salts being derived from an organic acid containing only carbon, hydrogen and oxygen, said salt being maintained at a temperature of between 300–400° C., in an inert atmosphere.

3. The process of claim 2 wherein the metal salt is contained in an inert high-boiling liquid carrier, and the cyclopentadiene hydrocarbon vapor is bubbled through said liquid carrier.

4. The process of claim 2 wherein said cyclopentadiene hydrocarbon is a mixture of individual monomeric cyclopentadiene hydrocarbons.

References Cited in the file of this patent

UNITED STATES PATENTS

| | | |
|---|---|---|
| 2,769,828 | Sieg | Nov. 6, 1956 |
| 2,817,674 | Graham et al. | Dec. 24, 1957 |
| 2,898,360 | Hogan et al. | Aug. 4, 1959 |

FOREIGN PATENTS

| | | |
|---|---|---|
| 1,092,700 | France | Nov. 10, 1954 |
| 1,108,869 | France | Sept. 14, 1955 |

OTHER REFERENCES

Sidegwick: "Chemical Elements and Their Compounds," vol. II (1950). Oxford University Press, London, page 1435 relied on.